US008078214B2

(12) United States Patent
Yaginuma et al.

(10) Patent No.: US 8,078,214 B2
(45) Date of Patent: Dec. 13, 2011

(54) WIRELESS COMMUNICATION SYSTEM WITH WIRELESS BASE STATION AND LEAKY TRANSMISSION LINES

(75) Inventors: Jun Yaginuma, Shizuoka (JP); Naohiro Matsushita, Shizuoka (JP); Tomonori Sugiyama, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 728 days.

(21) Appl. No.: 12/170,700

(22) Filed: Jul. 10, 2008

(65) Prior Publication Data

US 2009/0017862 A1 Jan. 15, 2009

(30) Foreign Application Priority Data

Jul. 13, 2007 (JP) ................................. 2007-184522

(51) Int. Cl.
*H04B 7/00* (2006.01)
*H04B 1/38* (2006.01)
*H04W 4/00* (2009.01)

(52) U.S. Cl. ..................... 455/523; 455/525; 455/426.1; 455/562.1

(58) Field of Classification Search .................. 455/523, 455/524, 525, 562.1, 561, 560, 426.1
See application file for complete search history.

(56) References Cited

U.S. PATENT DOCUMENTS

| | | | | |
|---|---|---|---|---|
| 4,012,662 A | * | 3/1977 | Martin | 455/523 |
| 4,476,574 A | * | 10/1984 | Struven | 455/523 |
| 4,866,732 A | * | 9/1989 | Carey et al. | 375/141 |
| 5,278,989 A | * | 1/1994 | Burke et al. | 455/8 |
| 5,329,576 A | * | 7/1994 | Handforth | 455/410 |
| 5,648,961 A | * | 7/1997 | Ebihara | 370/282 |
| 5,669,065 A | * | 9/1997 | Waye et al. | 455/523 |
| 5,752,164 A | * | 5/1998 | Jones | 455/454 |
| 5,924,033 A | * | 7/1999 | Carlsson et al. | 455/436 |
| 6,104,934 A | * | 8/2000 | Patton et al. | 455/561 |
| 6,671,463 B2 | * | 12/2003 | Davies | 398/5 |
| 2002/0173341 A1 | * | 11/2002 | Abdelmonem et al. | 455/561 |

FOREIGN PATENT DOCUMENTS

| | | |
|---|---|---|
| JP | 6-061905 A | 3/1994 |
| JP | 2005-236745 A | 9/2005 |

* cited by examiner

*Primary Examiner* — Tilahun B Gesesse
(74) *Attorney, Agent, or Firm* — Foley & Lardner LLP (57) ABSTRACT

A wireless communication system which includes a wireless base station; a plurality of leaky transmission lines that function as antennas of the wireless base station; and a selector for selecting each of the leaky transmission lines and thereby connecting the leaky transmission lines to the wireless base station, wherein only one leaky transmission line is selected and connected at any given time. The selector may select all of the leaky transmission lines cyclically, one at any given time. Alternatively, the selector may select one of the leaky transmission lines according to a control signal from a selection controller.

8 Claims, 13 Drawing Sheets

FIG.1

1. WIRELESS BASE STATION
2. SELECTOR
3. SELECTION CONTROLLER
4. RECEIVING SIGNAL DISCRIMINATOR
5. LEAKY TRANSMISSION LINE
6. WIRELESS AREA
7. WIRELESS DEVICE
100. WIRELESS COMMUNICATION SYSTEM

| LEAKY TRANSMISSION LINE | FLAG |
|---|---|
| LEAKY TRANSMISSION LINE 5-1 | 1 |
| LEAKY TRANSMISSION LINE 5-2 | 1 |
| LEAKY TRANSMISSION LINE 5-3 | 0 |
| LEAKY TRANSMISSION LINE 5-4 | 0 |

FIG.11

WIRELESS COMMUNICATION SYSTEM WITH WIRELESS BASE STATION AND LEAKY TRANSMISSION LINES

CROSS-REFERENCE TO RELATED APPLICATION

This application claims, under 35 USC 119, priority of Japanese Application No. 2007-184522 filed Jul. 13, 2007.

BACKGROUND OF THE INVENTION

1. Field of the Invention

The present invention relates to a wireless communication system including a wireless base station and leaky transmission lines functioning as antennas thereof.

2. Description of the Related Art

Known technologies use leaky transmission lines as antennas of wireless local area networks (WLAN) (see Standard ARIB STD-T66 (Manual of Leaky Coaxial Cable in Operation of ARIB STD-T66 and RCR STD-33) of the Japanese Association of Radio Industries and Businesses). Moreover, known methods for increasing the wireless area include layout configurations dividing transmissions to multiple leaky transmission lines. For example, proposed technology includes a power divider connected to an antenna connection terminal of a wireless base station and two leaky transmission lines connected to the power divider and extended in different directions, thereby providing a larger wireless area than that of a configuration having only one leaky transmission line connected to the wireless base station.

However, methods for dividing a leaky transmission line for connection thereto suffer from power losses of a power divider device connecting the common leaky transmission line to the multiple leaky transmission lines. As examples of the very large electrical power losses involved, a division from one line to two lines causes an electrical power loss of 3 dB, and division to four lines causes an electrical power loss of 6 dB. As a result of these losses, the lengthwise portions of the leaky transmission lines providing the desired performance are shorter, and therefore the attempt to increase the wireless area falls short of expectations.

SUMMARY OF THE INVENTION

The present invention is purposed to provide a wireless communication system including a plurality of leaky transmission lines for sufficiently increasing a wireless area.

The wireless communication system according to the present invention includes: a wireless base station; a plurality of leaky transmission lines functioning as antennas of the wireless base station; and a selector, the selector allowing the wireless base station to connect to only one of the plurality of leaky transmission lines at any given time.

The wireless communication system according to the present invention does not use a power divider, and conversely provides selective connection of the wireless base station to one of the leaky transmission lines at any given time. This configuration avoids division losses, thereby increasing the effective lengths of the leaky transmission lines over those of conventional art by an amount of the avoided losses. In other words, the wireless area is sufficiently increased.

DESCRIPTION OF THE PREFERRED EMBODIMENTS (A) First Embodiment

A wireless communication system according to a first embodiment of the present invention is described in detail below with reference to the figures.

(A-1) Configuration of the First Embodiment

Figure 1:
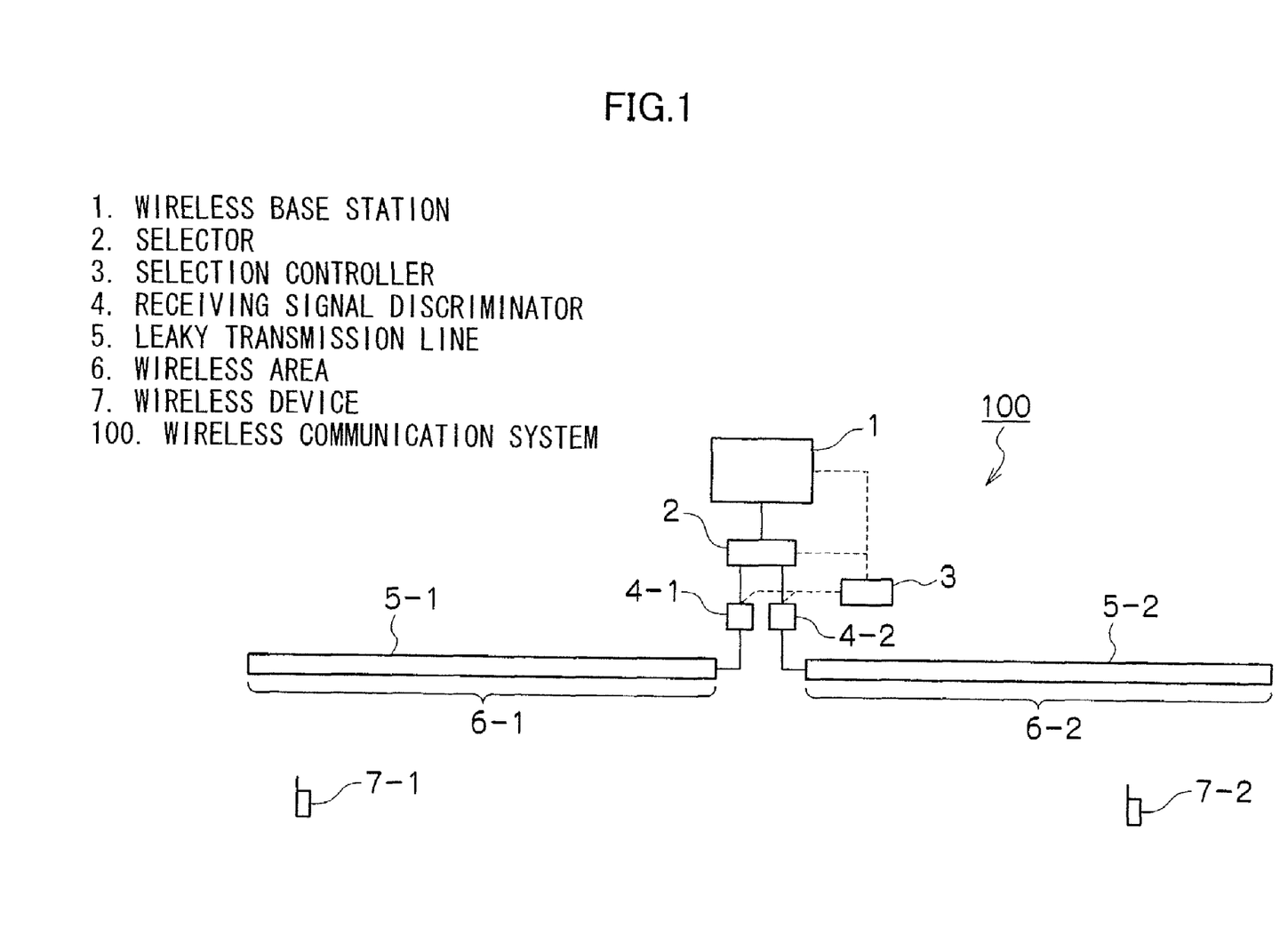
FIG. 1 is a block diagram illustrating a wireless communication system according to a first embodiment of the present invention.

FIG. 1 is a block diagram illustrating a wireless communication system 100 according to the first embodiment. The wireless communication system 100 of FIG. 1 includes a wireless base station 1, a selector 2, a selection controller 3, receiving signal discriminators 4-1 and 4-2, leaky transmission lines 5-1 and 5-2, and wireless devices 7 (7-1 and 7-2).

The wireless base station 1, for example, may be inside a base control station (not illustrated) and under the control thereof, thereby connecting to an external network (such as a public Internet Protocol (IP) network). The wireless base station 1 enables communications of the wireless devices 7 (7-1 and 7-2) with the external network, as well as communications of the wireless devices 7 with each other. Antennas of the wireless base station 1 are formed by the leaky transmission line 5-1 and the leaky transmission line 5-2.

The selector 2 is connected to an antenna connection terminal of the wireless base station 1. The selector 2 connects the common antenna connection terminal of the wireless base station 1 to the leaky transmission lines 5-1 and 5-2, wherein only one of the leaky transmission lines at any given time.

The receiving signal discriminator 4-1 is arranged in an information channel between the selector 2 and the leaky transmission line 5-1. Likewise, the receiving signal discriminator 4-2 is arranged in an information channel between the selector 2 and the leaky transmission line 5-2. Each of the receiving signal discriminators 4-1 and 4-2 is configured to monitor signals from the wireless devices 7-1 and 7-2 in the wireless areas 6-1 and 6-2 captured by the corresponding leaky transmission lines 5-1 and 5-2, respectively, and determine whether the incoming signals are transmissions sent to the wireless base station 1. For example, the determination may be performed by comparing electrical voltage levels of the leaky transmission lines 5-1 and 5-2 to a threshold value. The receiving signal discriminators 4-1 and 4-2 do not hinder signals from transmitting in both directions between the wireless base station 1 and each of the leaky transmission lines 5-1 and 5-2, respectively.

As described below in the description of operation, the selection controller 3 receives status information from the receiving signal discriminators 4-1 and 4-2. Based on criteria such as this status information and the status of the selector 2 just beforehand, the selection controller 3 controls the selector 2, thereby connecting the wireless base station 1 to each of the leaky transmission lines 5-1 and 5-2, albeit to only one of the leaky transmission lines at any given time.

The wireless devices 7 (7-1 and 7-2) communicate with other wireless devices or external networks through the wireless base station 1. The wireless devices 7 may be mobile or non-portable devices. Furthermore, methods of communication such as digital modulation, etc. between the wireless base station 1 and the wireless devices 7 are separate from the scope of the first embodiment and are in no way limited thereby.

(A-2) Operation According to the First Embodiment

Herewith, various examples of operation of the wireless communication system 100 according to the first embodiment are described. The following descriptions of operations referencing FIG. 2 through FIG. 4, for example, are in accordance with the IEEE 802.11 standard.

Figure 2:
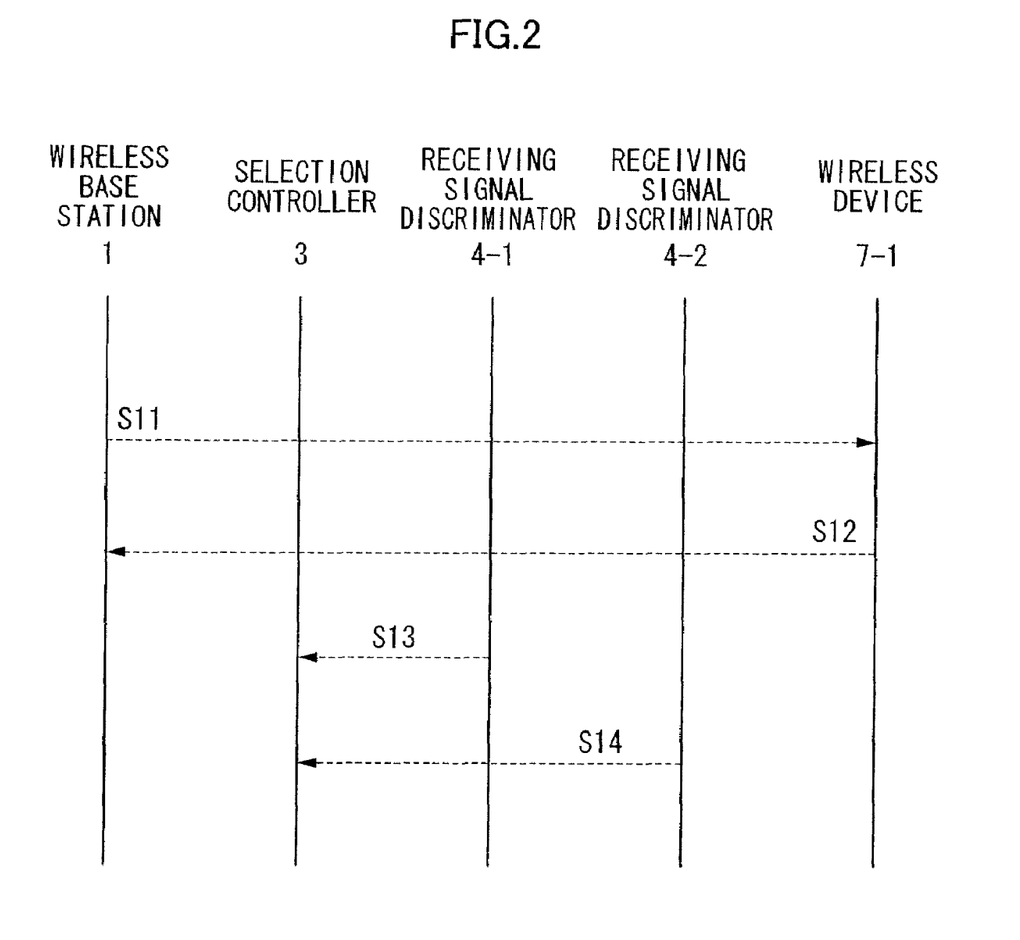
FIG. 2 is a sequence diagram (part 1) illustrating an operation for antenna selection by the wireless communication system according to the first embodiment of the present invention.

First, an example is described with reference to the sequence diagram of FIG. 2, wherein the leaky transmission line 5-1 is selected by the selector 2, and only the wireless device 7-1 operates in only the wireless area 6-1 corresponding thereto.

The wireless base station 1 ascertains the status of the wireless areas 6-1 and 6-2, for example, by transmitting a beacon signal at a predetermined frequency. The selector 2, at this point in time, only selects the leaky transmission line 5-1, and therefore the beacon signal from the wireless base station 1 passes through the selector 2 and the receiving signal discriminator 4-1 to be radiated from the leaky transmission line 5-1 and received by the wireless device 7-1, (S11). The wireless device 7-1 then returns a response signal to indicate its presence. The response signal is received by the wireless base station 1 through the receiving signal discriminator 4-1 and the selector 2 (S12).

The response signal transmits through the receiving signal discriminator 4-1, and the receiving signal discriminator 4-1 determines therefrom that the wireless device 7-1 is operating in the wireless area 6-1. The receiving signal discriminator 4-1 sends a flag value of "1" to the selection controller 3 to indicate the presence of the operating wireless device 7-1 (S13). Conversely, the receiving signal discriminator 4-2 maintains a flag value of "0" to indicate the absence of a wireless device operating in its corresponding area. The selection controller 3 receives the flag value of "0" (S14).

The flag of the receiving signal discriminator 4-1 is "1," the flag of the receiving signal discriminator 4-2 is "0," and the leaky transmission line 5-1 is selected, i.e., the wireless device 7-1 is operating in only the wireless area 6-1 corresponding to the currently selected leaky coaxial cable 5-1, and therefore the selection controller 3 does not send a selection control signal to change the setting of the selector 2, thus maintaining the selection of the leaky transmission line 5-1.

Thus, as described above, in the case where the wireless device 7-1 operates in the wireless area 6-1 corresponding to the selected leaky transmission line 5-1, the selection is left unchanged, and communication continues between the wireless base station 1 and the wireless device 7-1.

Figure 3:
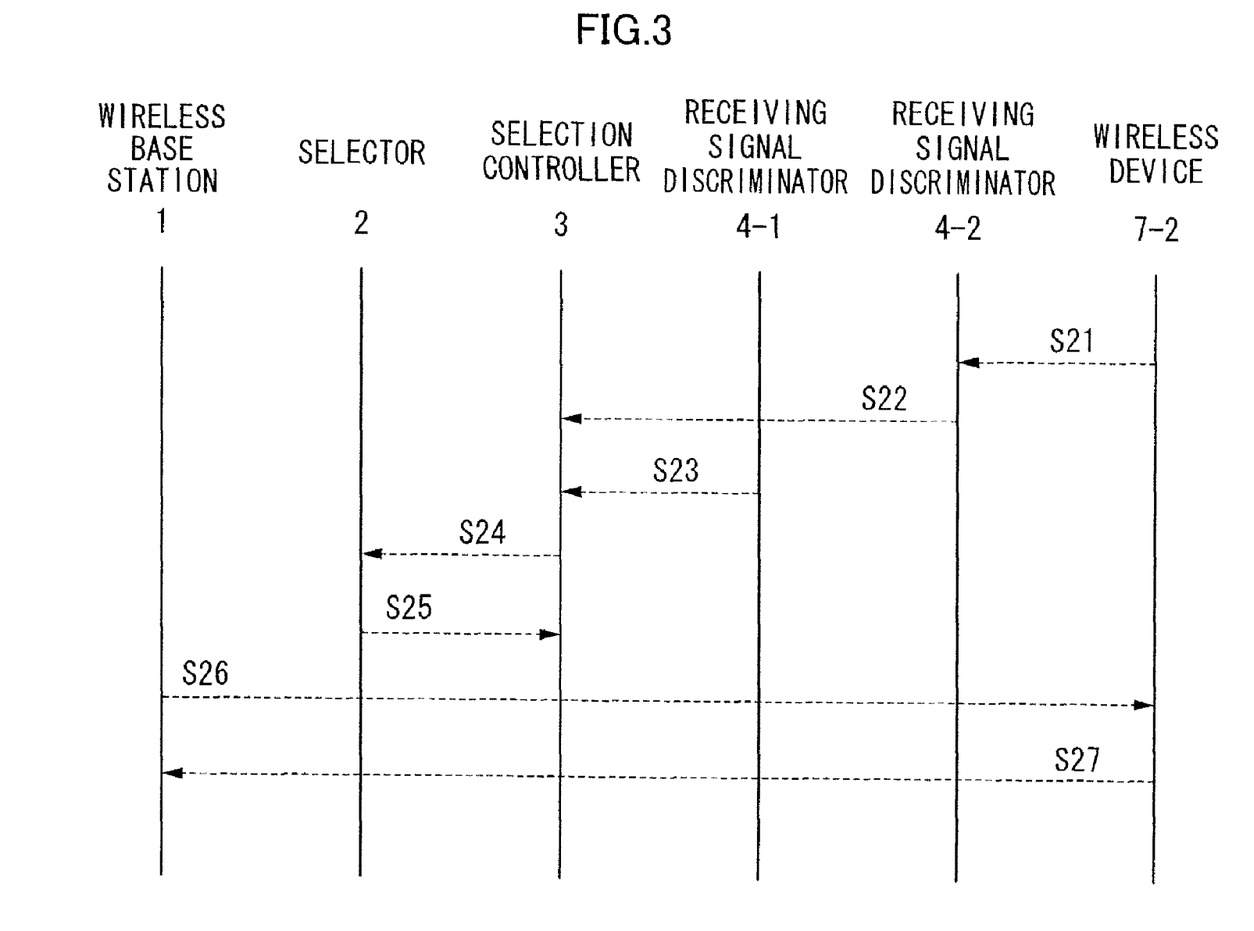
FIG. 3 is a sequence diagram (part 2) illustrating an operation for antenna selection by the wireless communication system according to the first embodiment of the present invention.

Next, an example is described with reference to FIG. 3, wherein the leaky transmission line 5-1 is selected by the selector 2, and only the wireless device 7-2 operates in the wireless area 6-2.

The wireless device 7-2 sends a probe request to ascertain the status of the surrounding area before beginning communication (S21). At this point in time, the selector 2 is set to the leaky transmission line 5-1, and therefore the probe request captured by the leaky transmission line 5-2 goes no further than the receiving signal discriminator 4-2. The receiving signal discriminator 4-2, having received the probe request, thereby sends a flag value of "1" to indicate the presence of the wireless device 7-2 operating in the wireless area 6-2 corresponding to the leaky transmission line 5-2. The selection controller 3 receives the flag value of "1" (S22)

Conversely, at this point in time, no wireless devices are operating in the wireless area 6-1 corresponding to the leaky transmission line 5-1, and the receiving signal discriminator 4-1 indicates a flag value of "0." The selection controller 3 receives the flag value of "0" (S23).

The flag corresponding to the leaky transmission line 5-2 is "1" and the flag corresponding to the leaky transmission line 5-1 is "0," and therefore the selection controller 3 sends a selection control signal to the selector 2 to change the selection setting to the leaky transmission line 5-2 (S24). According to this signal, the selector 2 changes the selection to the leaky transmission line 5-2, thereby activating the wireless area 6-2. The selector 2 sends information to the selection controller 3 regarding the currently selected antenna (S25).

The wireless device 7-2 is located in the now-activated wireless area 6-2 and therefore receives the beacon signal from the wireless base station 1(S26). The wireless device 7-2 sends a signal responding to the beacon (S27).

Thus, as described above, the status of the system changes such that the wireless device 7-2, located in the wireless area 6-2 corresponding to the previously unselected leaky transmission line 5-2, now can communicate with the wireless base station 1.

Figure 4:
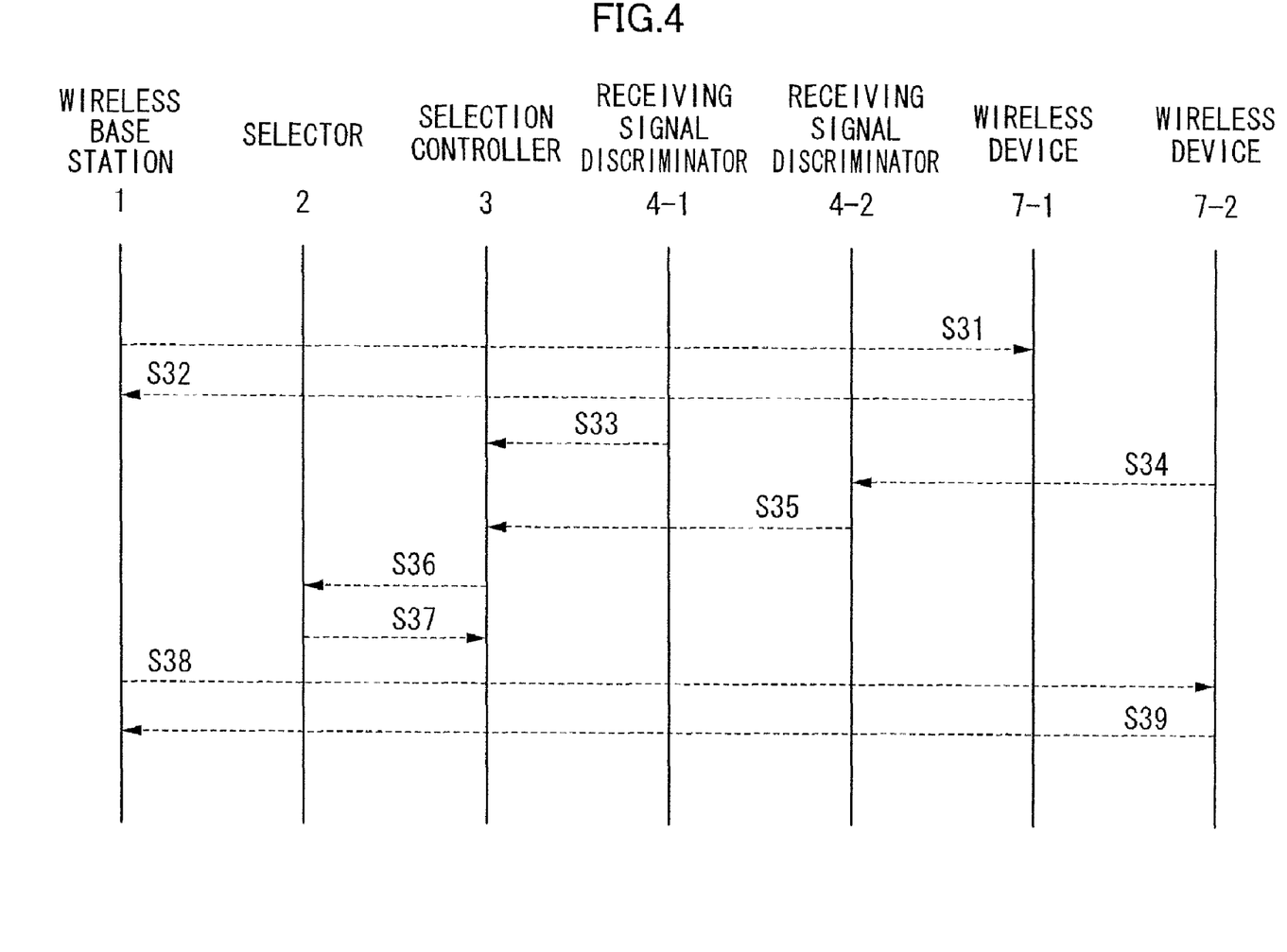
FIG. 4 is a sequence diagram (part 3) illustrating an operation for antenna selection by the wireless communication system according to the first embodiment of the present invention.

Next, an example is described with reference to FIG. 4, wherein the leaky transmission line 5-1 is selected, the wireless device 7-1 is operating in the wireless area 6-1, and the wireless device 7-2 is operating in the wireless area 6-2.

The leaky transmission line 5-1 is selected, and therefore the beacon signal from the wireless base station 1 transmits through the selector 2 and the receiving signal discriminator 4-1 to be radiated from the leaky transmission line 5-1 and received by the wireless device 7-1 (S31). The wireless device 7-1 then returns a response signal. The response signal is received by the wireless base station 1 through the receiving signal discriminator 4-1 and the selector 2 (S32). The receiving signal discriminator 4-1 determines from the response signal that the wireless device 7-1 is operating in the wireless area 6-1 and therefore sends a flag value of "1" to indicate the presence of an operating wireless device. The selection controller 3 receives the flag value of "1" (S33).

The operating wireless device 7-2 sends a probe request intended for the wireless base station 1 (S34). At this point in time, the leaky transmission line 5-1 is selected by the selector 2, and therefore the probe request goes no further than the receiving signal discriminator 4-2. The receiving signal discriminator 4-2 sends a flag value of "1" to indicate the presence of the operating wireless device 7-2. The selection controller 3 receives the flag value of "1" (S35)

The selection controller 3 sends a selection control signal to the selector 2 to change the selection setting to the leaky transmission line 5-2 (S36). The selector 2 changes the selection to the leaky transmission line 5-2 and returns information to the selection controller 3 regarding the currently selected leaky transmission line (5-2) (S37)

Now, only the leaky transmission line 5-2 is selected, and therefore the beacon signal from the wireless base station 1 is received by the wireless device 7-2 (S38) The wireless device 7-2 returns a response signal (S39). From this point onward, an operation similar to that recited above repeats.

Two leaky transmission lines have flag values of "1" and therefore the selection controller 3 appropriately sends selection control signals to the selector 2 to switch the selection back and forth between the two leaky transmission lines. A method for changing the selection among leaky transmission lines will be described in detail later for such a case where wireless devices operate in wireless areas corresponding to more than one leaky transmission line.

Herewith, details of the selection intervals between the leaky transmission lines, i.e., antennas, are described.

Generally, Transmission Control Protocol (TCP) or User Datagram Protocol (UDP) is used for communication over a WLAN. TCP continuously confirms transmissions and resends data to compensate for obstructions during transmission, duplicated data, lost data, etc. TCP therefore provides accurate transmissions with high reliability. On the other hand, UDP has no mechanism for flow control or resending data. UDP therefore has inferior reliability, but may perform well in applications requiring an instantaneous response. A wireless IP phone is one typical example of a device using UDP. According to the first embodiment as well, stable wireless communications are necessary between different wireless areas. Wireless IP phones generally communicate through Session Initiation Protocol (SIP) servers, in which a transmission band is defined by an encryption method and a packet send period. Conventional systems allow packet send periods of 10 milliseconds or longer in increments of 10 milliseconds.

Figure 5:
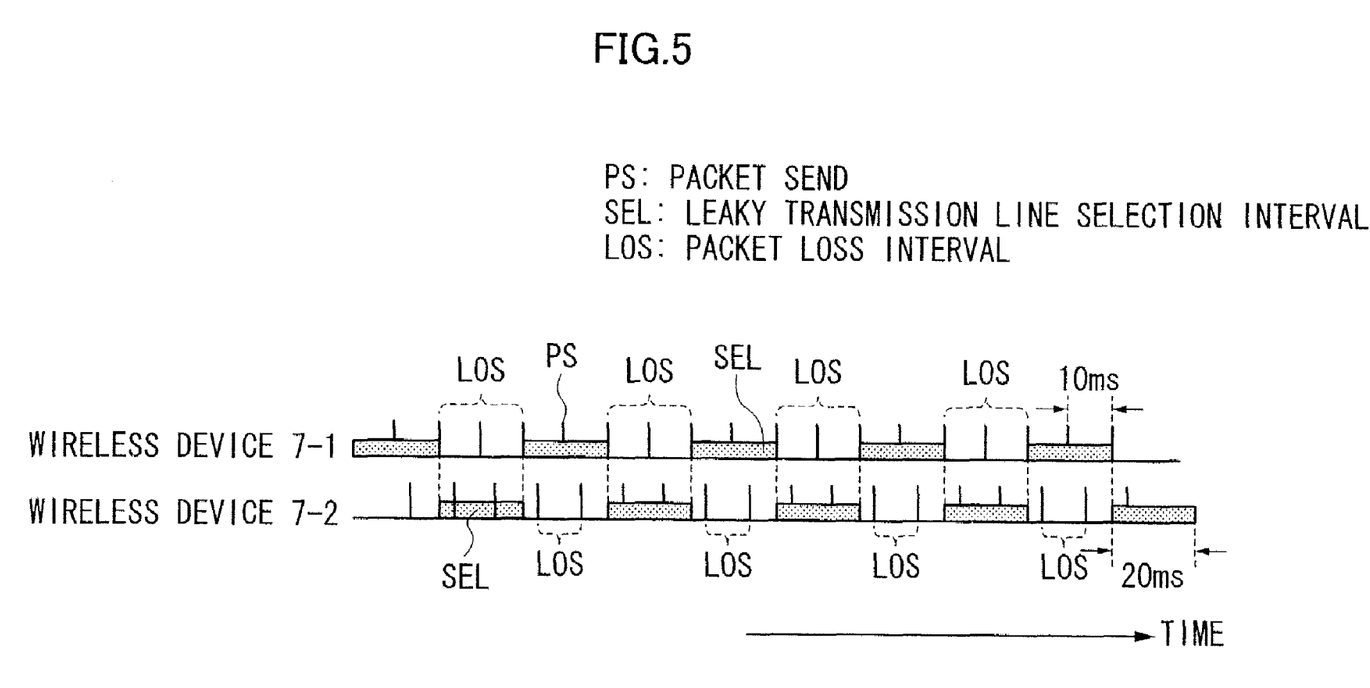
FIG. 5 is a timing chart illustrating selection intervals between leaky transmission lines of the wireless communication system according to the first embodiment of the present invention.

Herewith, an example of intervals related to changing the selection between leaky transmission lines, i.e., antennas, is described with reference to FIG. 5, wherein the wireless device 7-1 and the wireless device 7-2 are wireless IP phones, and the packet send period of communication is 10 milliseconds. FIG. 5 illustrates an ineffective example of communication, wherein the selection interval of the leaky transmission lines is too long. Conditions are required to prevent such discrepancies, as described later in a description of the selection intervals between the leaky transmission lines. Here, the selection intervals of the leaky transmission lines exist as information settings within the selection controller 3.

Turning now to FIG. 5, the packet send (PS) symbols represent the timing of packet sends for the wireless devices 7-1 and 7-2. The example in FIG. 5 has a packet send period of 10 milliseconds (10 ms), which means that each packet is sent 10 milliseconds after its preceding packet. For example, each of the wireless devices 7-1 and 7-2 sends data packets according to the respective timers, and the transmissions of the wireless devices 7-1 and 7-2 are not synchronized to each other.

In FIG. 5, the cross-hatched zones (SEL) represent selection intervals of the leaky transmission lines 5-1 and 5-2 corresponding to the wireless devices 7-1 and 7-2 located in the wireless areas 6-1 and 6-2, respectively. The packet loss intervals (LOS) represent intervals of packet loss located between selection intervals (SEL) of the leaky transmission lines. The packet loss intervals (LOS) are the intervals in which packets sent by the wireless devices 7-1 and 7-2 are not received by the wireless base station 1.

Each of the wireless devices 7-1 and 7-2 send data packets, including voice data, every 10 milliseconds per the respective packet send timings (PS). Wireless communication proceeds successfully in the case when the corresponding leaky transmission line 5-1 or 5-2 is selected at the time of the packet send. Moreover, in the case when the corresponding leaky transmission line 5-1 or 5-2 is initially not selected but then becomes selected prior to the timing of the next packet send, the lost packet maybe resent during the wireless interval and communication may proceed successfully thereby.

However, the wireless base station 1 does not receive any of the packets sent during intervals when the corresponding leaky transmission line 5-1 or 5-2 is not selected. Such packet loss causes sound break up and poor communication quality.

Therefore, to prevent a loss of the resent packet, it is necessary to select a leaky transmission line corresponding to a packet in sufficient time before the packet is resent. This condition can be generalized by the leaky transmission line selection interval (antenna selection interval) being equal to or less than P/(N−1) milliseconds, where P is the packet send period in milliseconds and N is the number of leaky transmission lines, i.e., antennas. For example, two leaky transmission lines (antennas), with a packet send period of 10 milliseconds require a leaky transmission line selection interval equal to or less than 10/(2−1) or 10 milliseconds.

Herewith, details of the timing of the selection of the leaky transmission lines by the selection controller 3 are described, in a case where the wireless device 7-1 operates in the wireless area 6-1 and the wireless device 7-2 operates in the wireless area 6-2.

For example, deselecting a leaky transmission line during the transmission of a signal (packet), from a corresponding wireless device 7-1 or 7-2 to the wireless base station 1 causes a loss of the packet, requires a resend during a wireless interval, and reduces communication quality. To prevent such problems, in the case where the selection controller 3 receives more than one flag (when the flag value is "1"), an acknowledge protocol signal (ACK) received by the wireless base station 1 is transmitted to the selection controller 3, or an ACK is sent by the wireless base station 1 to the selection controller 3 to indicate completion of the data transmission, whereby the selection is changed to the other leaky transmission line immediately after the packet reaches its destination.

(A-3) Effects of the First Embodiment

According to the first embodiment, selective connection of the wireless base station to one of two leaky transmission lines at any given time is accomplished without using a power divider, thereby avoiding losses related to dividing signals and increasing the effective lengths of the leaky transmission lines over those of conventional art by an amount of the avoided losses. In other words, the wireless area is sufficiently increased.

Moreover, in the case where the length of the leaky transmission lines are left unchanged, a reduction of the electrical power broadcast from the wireless base station may be possible.

In addition, shorter selection intervals for the leaky transmission lines enable switching among leaky transmission lines to provide communications among wireless devices in different wireless areas.

Furthermore, detecting the completion of the packet transmission prior to changing the leaky transmission line selection enables stable communications of enhanced quality.

(A-4) Modification of the First Embodiment

Figure 6:
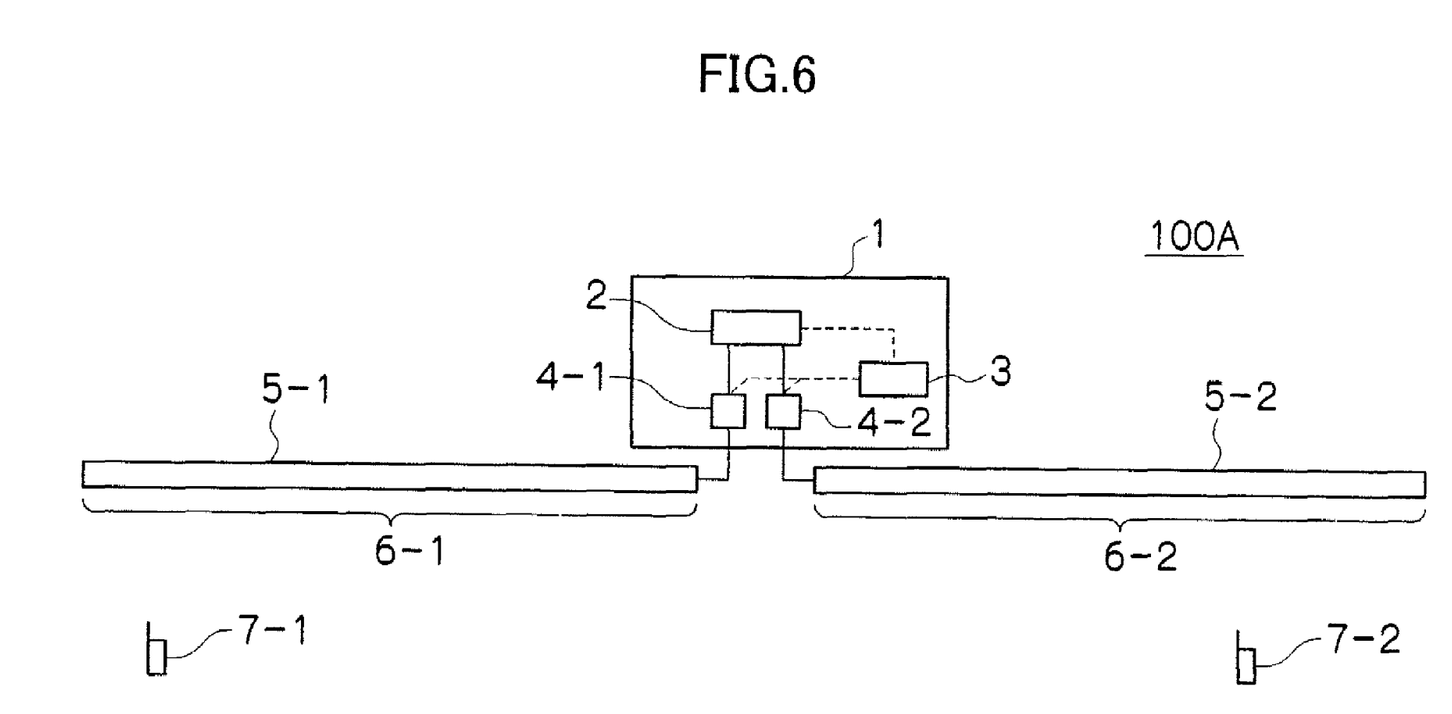
FIG. 6 is a block diagram illustrating a wireless communication system according to a modification of the first embodiment of the present invention.

FIG. 6 is a block diagram illustrating a modification in which a portion of the application according to the first embodiment is modified. The wireless communication system 100A according to this modification includes a selector 2, a selection controller 3, and receiving signal discriminators 4-1 and 4-2, all included inside the wireless base station 1.

The components in and around the wireless base station 1 may require less space than those according to the first embodiment.

(B) Second Embodiment

Herewith, a wireless communication system according to a second embodiment of the present invention is described with reference to the figures.

(B-1) Configuration of the Second Embodiment

Figure 7:
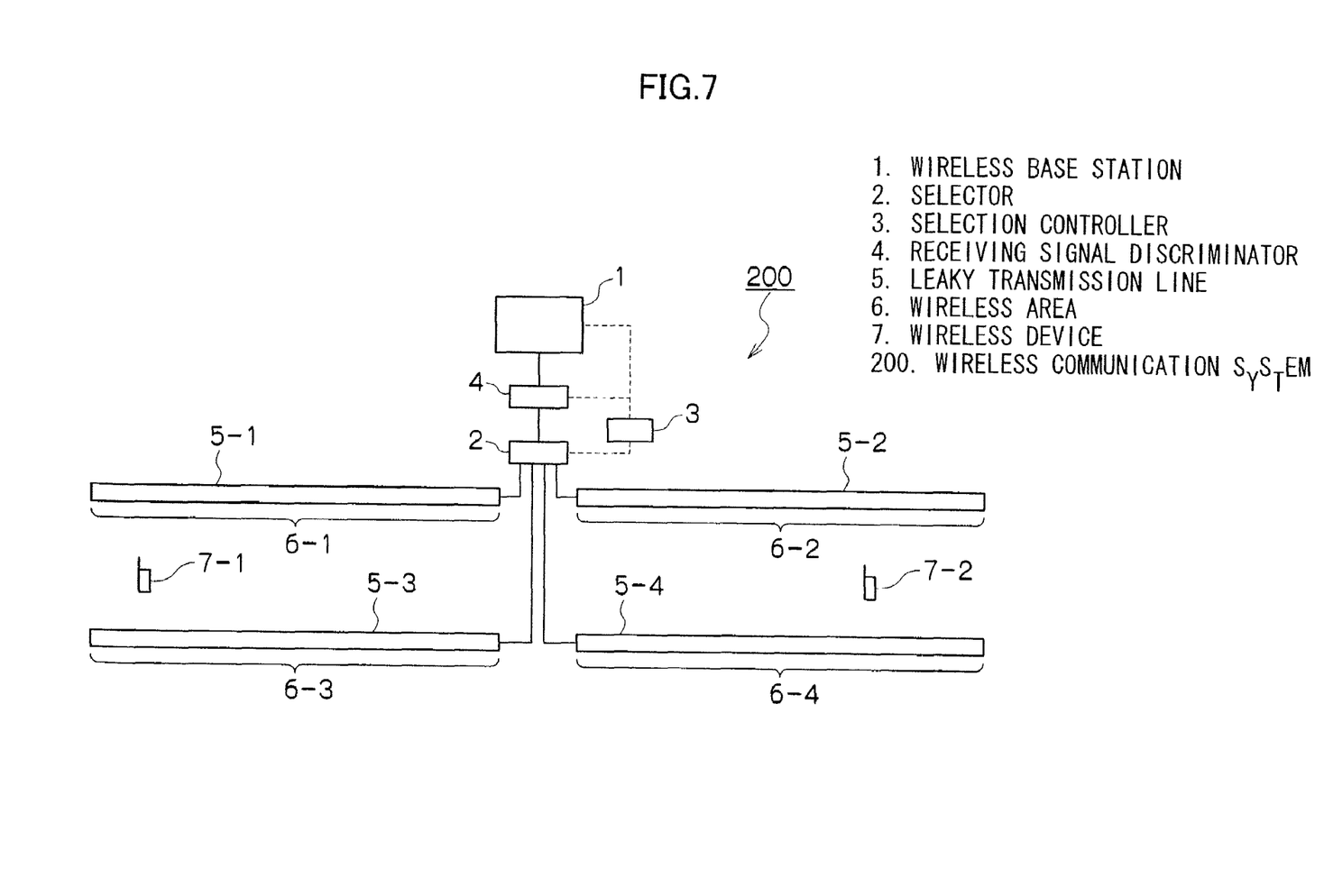
FIG. 7 is a block diagram illustrating a wireless communication system according to a second embodiment of the present invention.

FIG. 7 is a block diagram illustrating a wireless communication system 200 according to the second embodiment. The same numerals are used for elements corresponding to those according to the first embodiment in FIG. 1. FIG. 7 illustrates an example of four leaky transmission lines functioning as antennas of one wireless base station.

The wireless communication system 200 of FIG. 7 includes a wireless base station 1, a selector 2, a selection controller 3, an receiving signal discriminator 4, leaky transmission lines 5-1 through 5-4, and wireless devices 7 (7-1 and 7-2).

The wireless communication system 200 according to the second embodiment is similar to that of the first embodiment, except for the number of the leaky transmission lines 5-1 through 5-4, and the configuration using only one receiving signal discriminator 4 arranged closer to the wireless base station 1 than the selector 2. In addition, the functions of the selection controller 3 are also different from those of the first embodiment. The details of these differing features will become apparent from the descriptions of the operations that follow hereinafter.

(B-2) Operation According to the Second Embodiment

Herewith, various operations of the wireless communication system 200 according to the second embodiment are described. Here, the wireless devices 7-1 and 7-2 operate in the wireless areas 6-1and 6-2, respectively, as illustrated in FIG. 7.

First, a description is provided herewith for an initial operation for verifying whether wireless devices 7 for communication are operating in the wireless areas 6. The initial operation checks for wireless devices (7) operating in all of the wireless areas 6-1 through 6-4 corresponding to the leaky transmission lines 5-1 through 5-4, respectively, and therefore successively selects each of the leaky transmission lines 5-1 through 5-4, selecting only one at any given time.

When the electrical power is turned on for each device 1 through 4 as mentioned above, the selection controller 3 sends a selection control signal to the selector 2 to select the leaky transmission line 5-1. Accordingly, the selector 2 selects the leaky transmission line 5-1 and thereby activates the wireless area 6-1. As a result, the wireless device 7-1 in the wireless area 6-1 receives a beacon signal from the wireless base station 1, radiated by the leaky transmission line 5-1 and sends a response signal.

The receiving signal discriminator 4 receives the response signal, sets a flag value to "1" to indicate that a wireless device (7-1) is operating in the currently-selected wireless area (6-1). The selection controller 3 receives the flag value of "1." The leaky transmission line 5-1 is selected, and therefore the selection controller 3 stores identification information to indicate the operating wireless device 7-1 corresponding to the leaky transmission line 5-1.

Unlike FIG. 7, in the case where a wireless device is not located in the wireless area 6-1, the selection controller 3 receives a flag value of "0" and stores identification information linked to the leaky transmission line 5-1 to indicate the absence of an operating wireless device.

After completing the selection of the leaky transmission line 5-1, the selection controller 3 sends a selection control signal to the selector 2 to change the selection to the leaky transmission line 5-2. Then, an operation similar to that performed for the leaky transmission line 5-1 is performed, and the selection controller 3 stores identification information linked to the leaky transmission line 5-2 to indicate whether a wireless device is operating in the wireless area 6-2 corresponding to the leaky transmission line 5-2.

Figure 8:
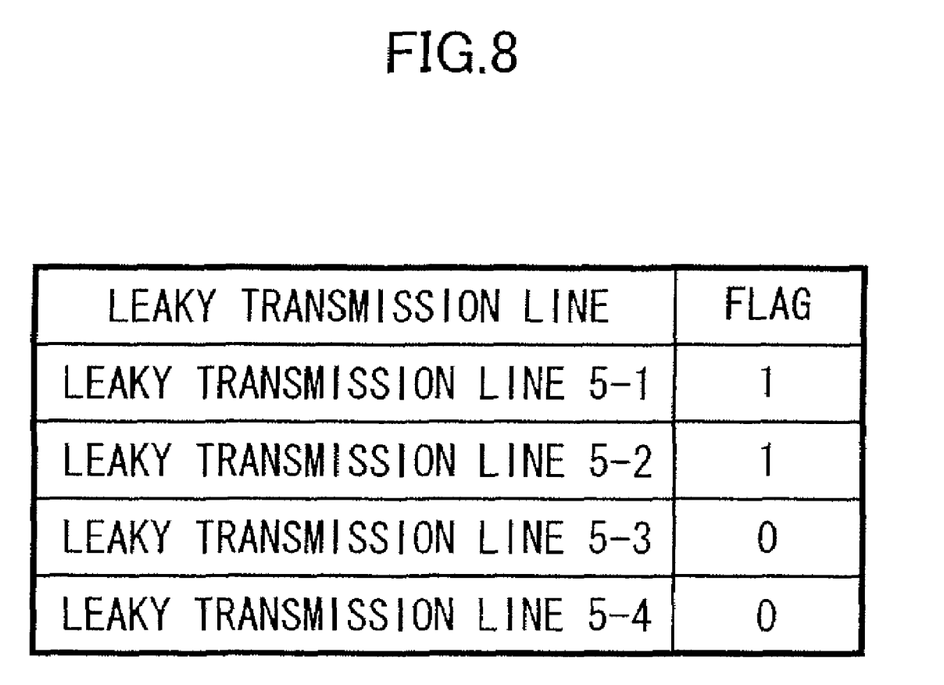
FIG. 8 is a table illustrating the operating status of wireless devices in wireless areas corresponding to leaky transmission lines of the wireless communication system according to the second embodiment of the present invention.

Similarly thereafter, the presence of wireless devices operating in the wireless areas (6-3 and 6-4) corresponding to all of the remaining leaky transmission lines (5-3 and 5-4), respectively, is verified, and the appropriate identification information linked to the corresponding leaky transmission lines is stored. FIG. 8 illustrates the stored identification information in a case such as that of FIG. 7 where the wireless devices 7-1 and 7-2 exist in the wireless areas 6-1 and 6-2, and no wireless devices are present in the wireless areas 6-3 and 6-4.

Figure 9:
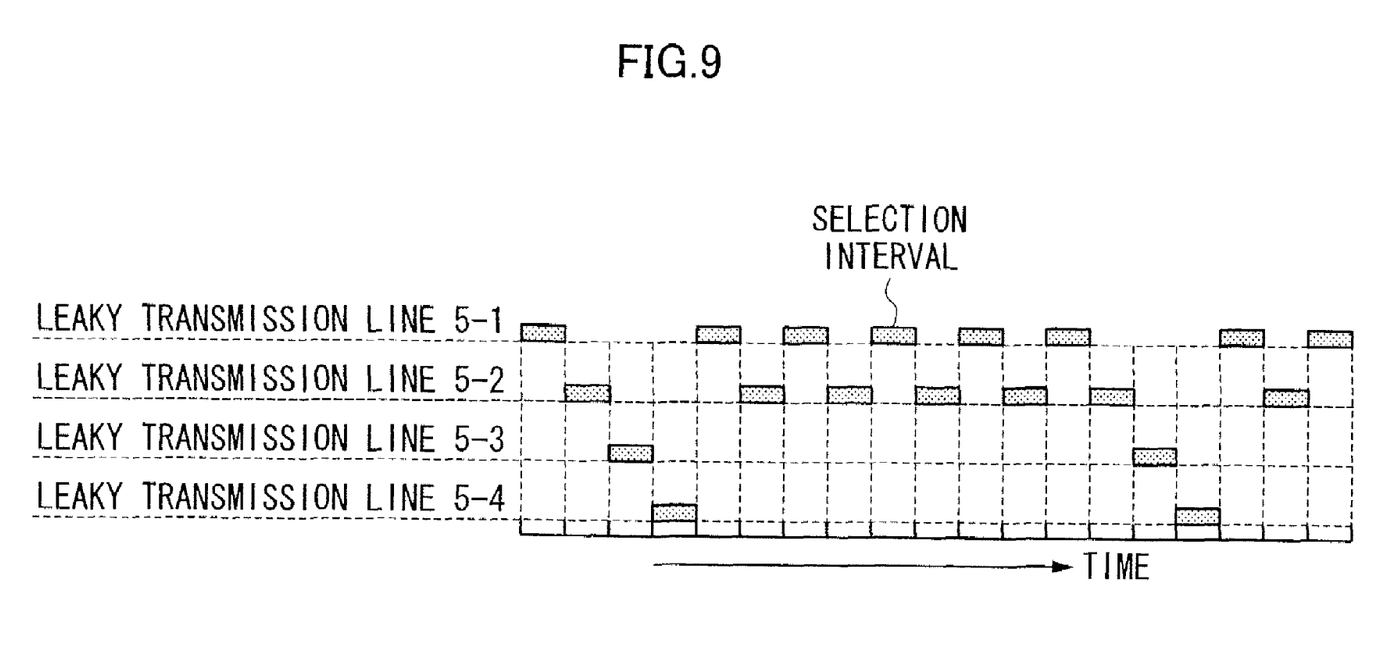
FIG. 9 is a timing chart illustrating the selection status of leaky transmission lines of the wireless communication system according to the second embodiment of the present invention.

Herewith, the selection of the leaky transmission lines according to the second embodiment is described with reference to FIG. 9. The selection controller 3 directs the selection of each of the leaky transmission lines 5-1 through 5-4 according to the stored information of FIG. 8, selecting only one leaky transmission line at any given time. FIG. 9 illustrates a period of time in which no changes occurred regarding the presence of wireless devices in the wireless areas 6-3 and 6-4 corresponding to the leaky transmission lines 5-3 and 5-4, respectively. Furthermore, the "selection intervals" of FIG. 9 are rough examples, and selection is determined according to such factors as the timing of packet sends.

The selection controller 3 controls the selection of the selector 2 to provide a high selection ratio for the leaky transmission lines 5-1 and 5-2 corresponding to the wireless devices 7-1 and 7-2 operating in the wireless areas 6-1 and 6-2, respectively, and a low selection ratio for the leaky transmission lines 5-3 and 5-4 corresponding to the absence of operating wireless devices in the wireless areas 6-3 and 6-4, respectively. FIG. 9 illustrates an example where the leaky transmission lines 5-1 and 5-2 are selected more often than the leaky transmission lines 5-3 and 5-4 in a ration of 5:1.

To stabilize high-quality wireless communications, it is favorable for the leaky transmission lines 5-1 and 5-2 corresponding to the wireless areas 6-1 and 6-2 having the wireless devices 7-1 and 7-2 operating therein, respectively, to be continuously selected. Communications may be desired at any time in the wireless areas 6-3 and 6-4 corresponding to the leaky transmission lines 5-3 and 5-4, respectively, and therefore it is necessary to appropriately verify the presence of wireless devices therein. Accordingly, the selection of the leaky transmission lines is controlled such that the selection ratios of areas in which wireless devices 7 operate are high, and the selection ratios of areas without operating wireless devices are low.

Herewith, the selection intervals of the leaky transmission lines according to the second embodiment are described. Here, the selection intervals of the leaky transmission lines exist as information settings within the selection controller 3.

The selection interval of the leaky transmission lines depends on a control method of the leaky transmission line, and settings are made to prevent packet loss as described in the first embodiment. For example, in the case of a control method such as that illustrated in FIG. 9, wherein the leaky transmission lines having a flag value of "1" are selected, after which all of the leaky transmission lines having a flag value of "0" are selected, the leaky transmission line selection interval (antenna selection interval), can be generalized by being equal to or less than P/(M−1) milliseconds, where P is the packet send period in milliseconds and M is the number of leaky transmission lines (antennas), connected to the selector 2. For example, in the case of four leaky transmission lines (antennas), and a packet send period of 10 milliseconds, a leaky transmission line selection interval is set equal to or less than 10/(4−1) or 10/3 milliseconds.

The timing of the selection of the leaky transmission lines is similar to that of the first embodiment, and therefore descriptions are omitted.

(B-3) Effects of the Second Embodiment

According to the second embodiment as well, a power divider is not used and therefore similar effects as those of the first embodiment are provided.

(B-4) Modification of the Second Embodiment

Figure 10:
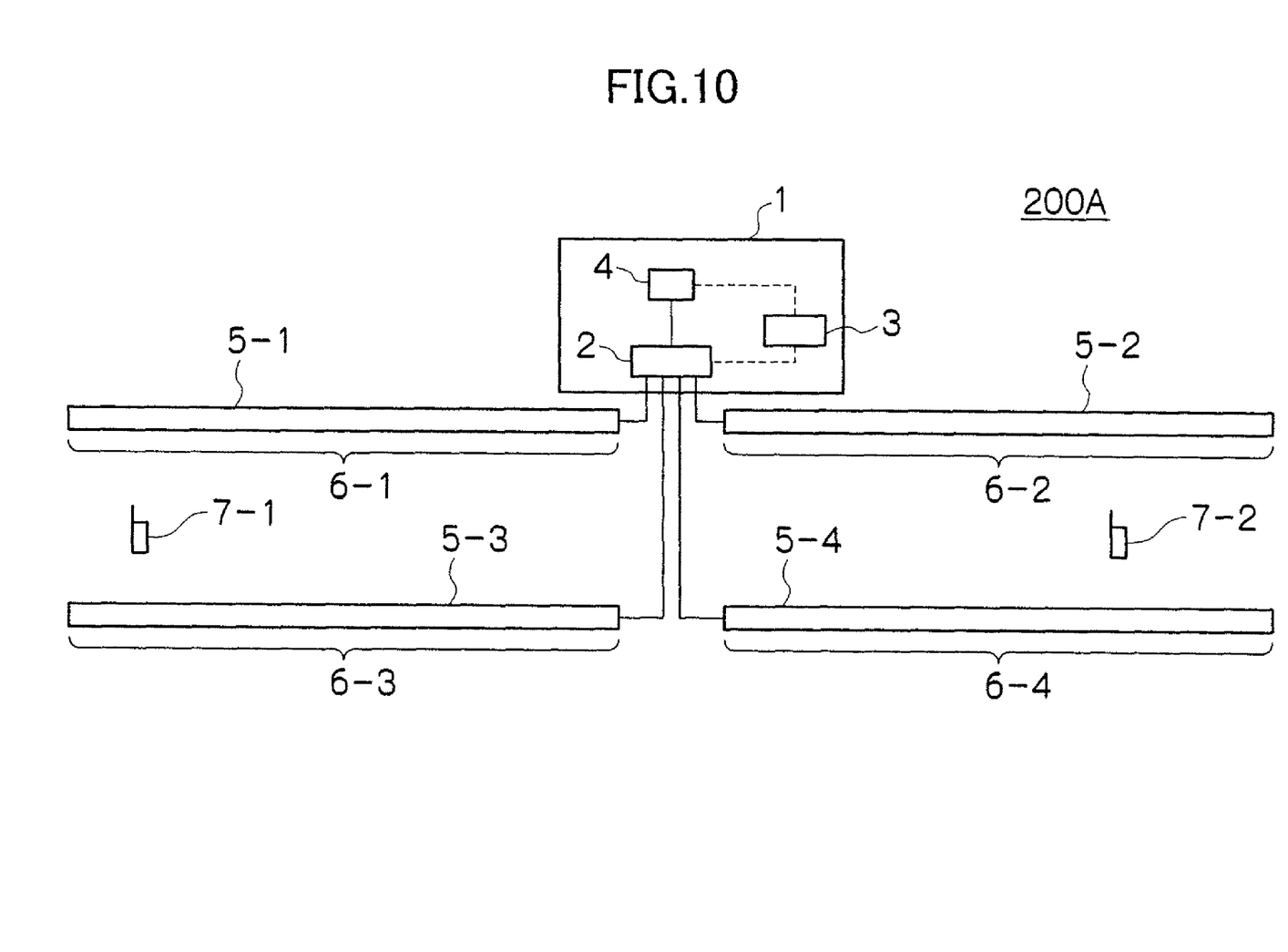
FIG. 10 is a block diagram illustrating a wireless communication system according to a modification of the second embodiment of the present invention.

FIG. 10 is a block diagram illustrating a modification in which a portion of the second embodiment is modified. The wireless communication system 200A according to this modification includes a selector 2, a selection controller 3, and a receiving signal discriminator 4, all included inside the wireless base station 1.

(C) Third Embodiment

Herewith, a wireless communication system according to a third embodiment of the present invention is described with reference to the figures.

Figure 11:
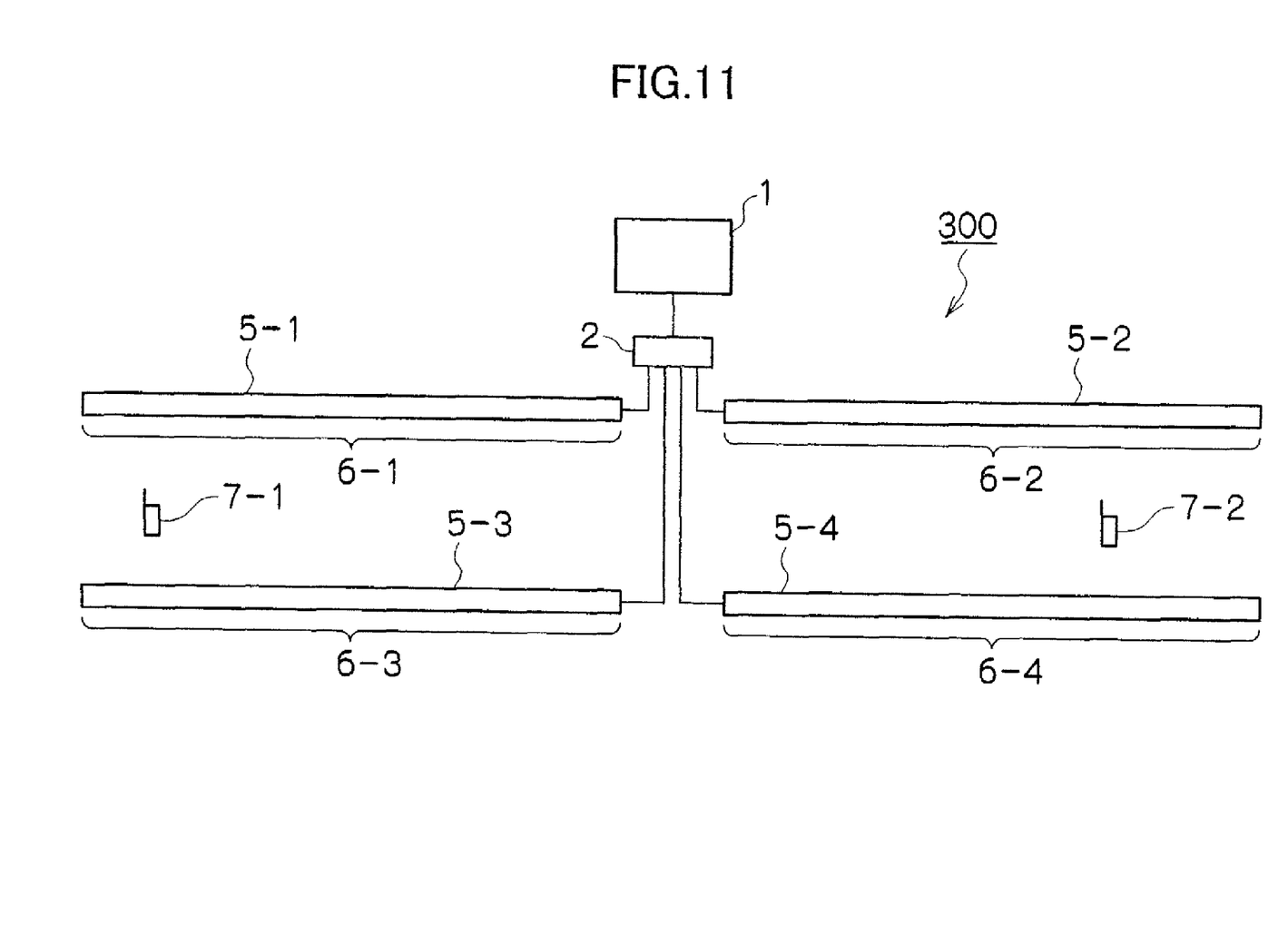
FIG. 11 is a block diagram illustrating a wireless communication system according to a third embodiment of the present invention.

FIG. 11 is a block diagram illustrating the wireless communication system 300 according to the third embodiment. The same numerals are used for elements corresponding to those of the first embodiment in FIG. 1 and the second embodiment in FIG. 7. FIG. 11 illustrates an example including four leaky transmission lines functioning as antennas of one wireless base station 1.

The wireless communication system 300 of FIG. 11 includes a wireless base station 1, a selector 2, leaky transmission lines 5-1 through 5-4, and wireless devices 7 (7-1 and 7-2). In other words, the third embodiment does not include the selection controller 3 and the receiving signal discriminator 4.

The selector 2 according to the third embodiment sequentially selects each of the leaky transmission lines 5-1 through 5-4, selecting only one leaky transmission line at any given time, such that all leaky transmission lines 5-1 through 5-4 are selected. In other words, the selector 2 selects the leaky transmission lines 5-1 through 5-4 without verifying the presence of wireless devices 7 in each of the corresponding wireless areas 6-1 through 6-4, respectively. That is, the leaky transmission lines 5-1and 5-2 corresponding to the wireless areas 6-1 and 6-2 in which the wireless devices 7-1 and 7-2 are present, respectively, are selected at frequencies similar to and without distinction from those of the leaky transmission lines 5-3 and 5-4 corresponding to wireless areas 6-3 and 6-4 having no wireless devices present.

Figure 12:
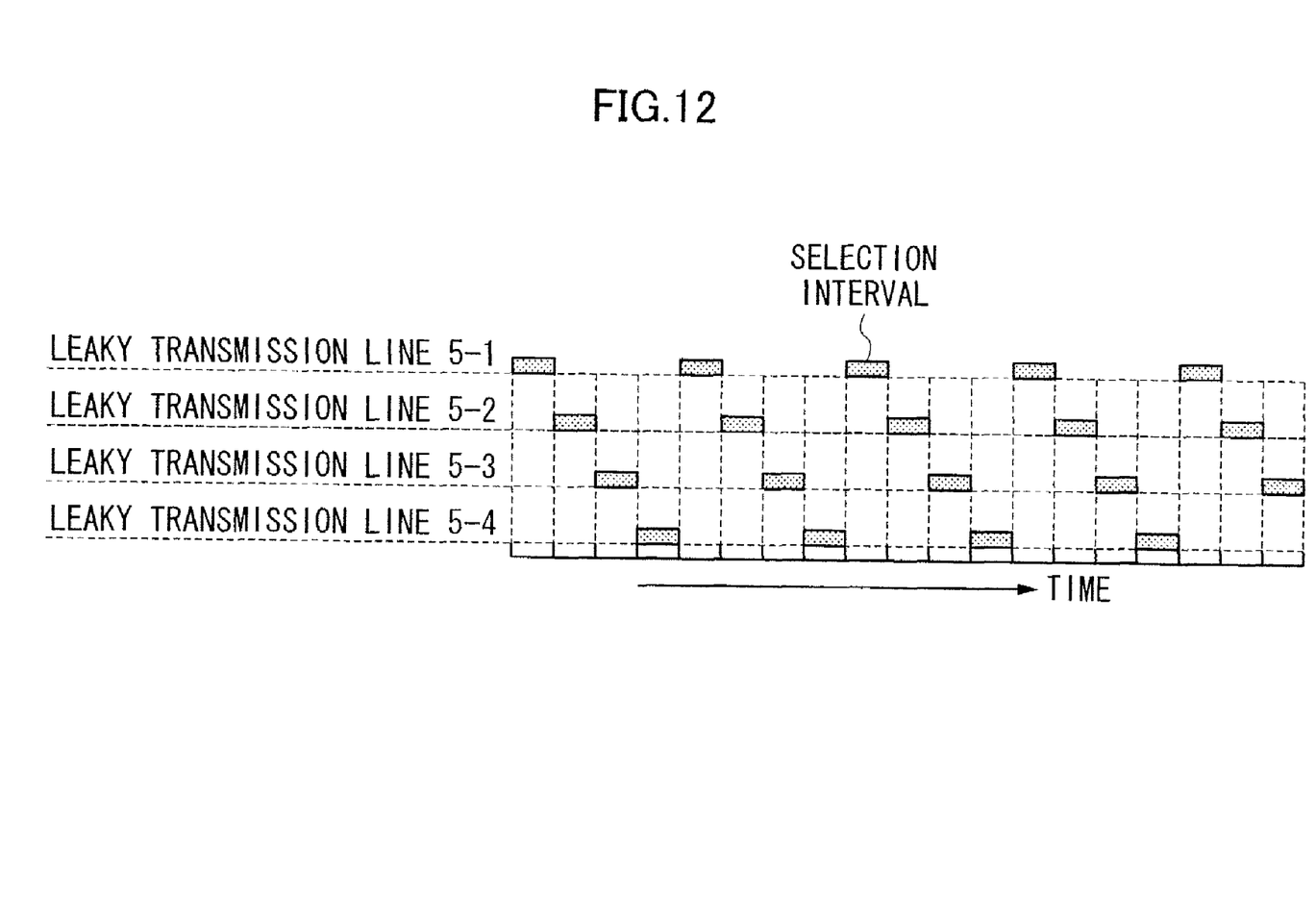
FIG. 12 is a timing chart illustrating the selection status of leaky transmission lines of the wireless communication system according to the third embodiment of the present invention.

FIG. 12 is a timing chart illustrating the selection method, i.e., selection status, of the leaky transmission lines 5-1 through 5-4 by the selector 2 according to the third embodiment. FIG. 12 illustrates an example in which the leaky transmission lines 5-1 through 5-4 are sequentially selected in this order.

In the third embodiment as well, the leaky transmission line selection interval can be generalized by being equal to or less than P/(M−1) milliseconds, where P is the packet send period in milliseconds and M is the number of leaky transmission lines connected to the selector 2. For example, in the case when the number of leaky transmission lines, i.e., antennas, is four and the packet send period is 10 milliseconds, a leaky transmission line selection interval is set equal to or less than 10/(4−1) or 10/3 milliseconds. Such settings of the selection interval of the leaky transmission lines can prevent packet loss.

The timing of the selection of the leaky transmission lines is similar to that of the first embodiment, and therefore descriptions are omitted.

According to the third embodiment as well, a power divider is not used, and therefore similar effects as those of the first embodiment are provided.

Figure 13:
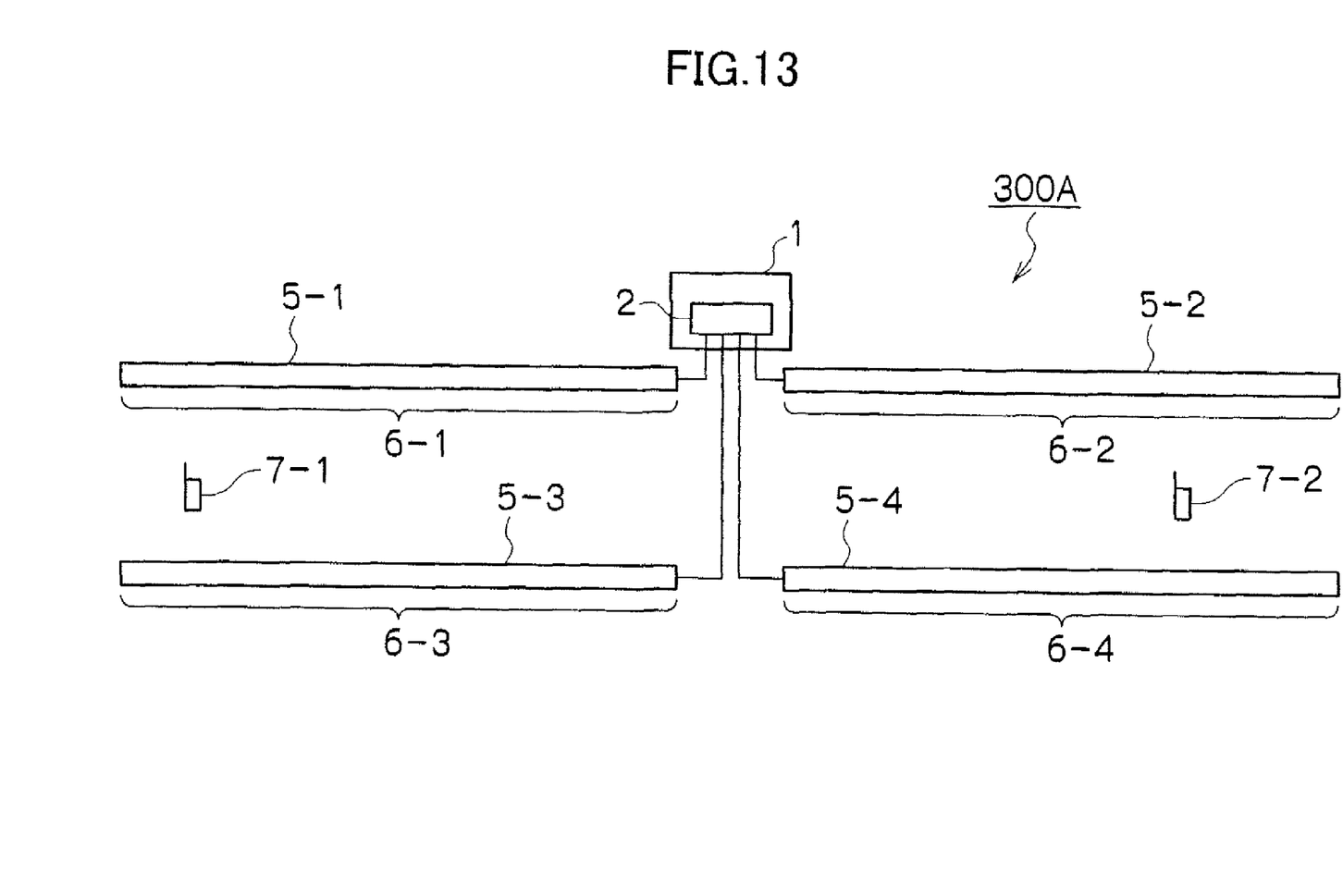
FIG. 13 is a block diagram illustrating a wireless communication system according to a modification of the third embodiment of the present invention.

FIG. 13 is a block diagram illustrating a modification in which a portion of the third embodiment is modified. The wireless communication system 300A according to this modification includes a selector 2 included inside the wireless base station 1.

(D) Other Embodiments

The present invention is in no way limited to the embodiments recited above, and may have other variations and embodiments such as the following examples.

The embodiments recited above illustrate examples having two and four leaky transmission lines, but it is to be understood that the number of leaky transmission lines is not limited to these examples.

Furthermore, the embodiments recited above illustrate leaky transmission lines configured such that the corresponding wireless areas do not overlap. However, the present invention may be implemented for wireless communication systems having overlapping wireless areas of leaky transmission lines. For example, the present invention may be implemented in a case where two leaky transmission lines are arranged parallel to each other, thereby providing wireless areas that overlap in a region between the leaky transmission lines. In such a case, a wireless device located in the overlapping region can communicate when either leaky transmission line is selected. The selection interval in such a case is set equal to or less than P/(L−1) milliseconds, where a number of wireless areas L is used in place of the number of leaky transmission lines M.

Also, the embodiments recited above illustrate a selector in the vicinity of a wireless base station. However, a leaky transmission line may be connected between the selector and the wireless base station.

What is claimed is:

1. A wireless communication system having a wireless base station and a plurality of leaky transmission lines configured to function as antennas of the wireless base station, comprising:
- a selector connected to the wireless base station, the selector configured to select each of the plurality of leaky transmission lines, wherein only one leaky transmission line is selected at any given time;
- a plurality of receiving signal discriminators connecting to each of the leaky transmission lines and configured to monitor a signal sent to the wireless base station and discriminate whether a wireless device is present in a corresponding wireless area of the leaky transmission line; and
- a selection controller configured to control the selection by the selector based on discrimination results of the receiving signal discriminators, whereby only the leaky transmission lines having a wireless device ready for communication in a wireless area are used,
- wherein a selection interval between selections of the leaky transmission lines is set to a value not more than $P/(N-1)$, where N is defined as the number of the leaky transmission lines having a wireless device ready for communication in a wireless area of the leaky transmission line, and P is defined as one of an interval between packets sent by the wireless base station and an interval between packets sent to the wireless base station.

2. The wireless communication system according to claim 1, wherein a selector, a selection controller, and receiving signal discriminators, are all included inside the wireless base station.

3. A wireless communication system having a wireless base station and a plurality of leaky transmission lines configured to function as antennas of the wireless base station, comprising:
- a selector connected to the wireless base station, the selector configured to select each of the plurality of leaky transmission lines, wherein only one leaky transmission line is selected at any given time;
- a receiving signal discriminator configured to monitor a signal sent to the wireless base station and discriminate whether a wireless device is present in a wireless area of the leaky transmission line selected by the selector; and
- a selection controller that: directs the selector to select each of the leaky transmission lines one by one while receiving discrimination results of the receiving signal discriminator for each selection; ascertains the leaky transmission lines having a wireless device ready to communicate in a wireless area and the leaky transmission lines having no wireless devices ready to communicate in a wireless area; and controls the selection by the selector, wherein a selection ratio of the leaky transmission lines corresponding to a wireless area having a wireless device ready to communicate is high and a selection ratio of the leaky transmission lines corresponding to a wireless area having no wireless device ready to communicate is low.

4. The wireless communication system according to claim 3, wherein a selection interval between selections of the leaky transmission lines is set to a value not more than $P/(M-1)$, where M is defined as the number of the leaky transmission lines, and P is defined as one of an interval between packets sent by the wireless base station and an interval between packets sent to the wireless base station.

5. The wireless communication system according to claim 3 or 4, wherein a selector, a selection controller, and receiving signal discriminators, are all included inside the wireless base station.

6. A wireless communication method for performing a wireless communication between a wireless device and a wireless base station via any one of a plurality of leaky transmission lines configured to function as antennas of the wireless base station,
- wherein a selector is connected to the wireless base station and is configured to select each of the plurality of leaky transmission lines, wherein only one leaky transmission line is selected at any given time,
- wherein each of a plurality of receiving signal discriminators connecting to each of the leaky transmission lines is configured to monitor a signal sent to the wireless base station and discriminate whether a wireless device is present in a corresponding wireless area of the leaky transmission line,
- wherein a selection controller is configured to control the selection by the selector based on discrimination results of the receiving signal discriminators, whereby only the leaky transmission lines having a wireless device ready for communication in a wireless area are used, and
- wherein a selection interval between selections of the leaky transmission lines is set to a value not more than $P/(N-1)$, where N is defined as the number of the leaky transmission lines having a wireless device ready for communication in a wireless area of the leaky transmission line, and P is defined as one of an interval between packets sent by the wireless base station and an interval between packets sent to the wireless base station.

7. A wireless communication method for performing a wireless communication between a wireless device and a wireless base station via any one of a plurality of leaky transmission lines configured to function as antennas of the wireless base station,
- wherein a selector is connected to the wireless base station and is configured to select each of the plurality of leaky transmission lines, wherein only one leaky transmission line is selected at any given time,
- wherein a receiving signal discriminator is configured to monitor a signal sent to the wireless base station and discriminate whether a wireless device is present in a wireless area of the leaky transmission line selected by the selector, and
- a selection controller directs the selector to select each of the leaky transmission lines one by one while receiving discrimination results of the receiving signal discriminator for each selection, ascertains the leaky transmission lines having a wireless device ready to communicate in a wireless area and the leaky transmission lines having no wireless devices ready to communicate in a wireless area, and controls the selection by the selector, wherein a selection ratio of the leaky transmission lines corresponding to a wireless area having a wireless device ready to communicate is high and a selection ratio of the leaky transmission lines corresponding to a wireless area having no wireless device ready to communicate is low.

8. The wireless communication method according to claim 7, wherein a selection interval between selections of the leaky transmission lines is set to a value not more than $P/(M-1)$, where M is defined as the number of the leaky transmission lines, and P is defined as one of an interval between packets sent by the wireless base station and an interval between packets sent to the wireless base station.

* * * * *